United States Patent
King et al.

(10) Patent No.: US 6,275,697 B1
(45) Date of Patent: *Aug. 14, 2001

(54) METHOD FOR COORDINATING THE OPERATION OF MOBILE EQUIPMENT

(75) Inventors: Neal J. King, Oakland; Peter J. Kozdon, Santa Clara, both of CA (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/670,386

(22) Filed: Jun. 25, 1996

(51) Int. Cl.[7] .................................................. H04Q 7/22
(52) U.S. Cl. ................................. 455/432; 455/434
(58) Field of Search ................................. 342/32, 30, 35; 455/69, 63, 67.1, 67.2, 434, 432, 439, 435

(56) References Cited

U.S. PATENT DOCUMENTS

| | | | |
|---|---|---|---|
| 5,303,287 | * 4/1994 | Laborde | 455/33.2 |
| 5,361,258 | * 11/1994 | Arnold et al. | 455/67.1 |
| 5,570,369 | * 10/1996 | Jokinen | 455/33.1 |
| 5,586,167 | * 12/1996 | Handforth | 455/16 |
| 5,598,459 | * 1/1997 | Haarsten | 455/11.1 |
| 5,613,204 | * 3/1997 | Haberman et al. | 455/33.2 |
| 5,790,952 | * 8/1998 | Seazholtz et al. | 455/432 |
| 5,809,421 | * 11/1999 | Manssen et al. | 455/432 |
| 5,850,609 | * 12/1998 | Sugarbroad et al. | 455/422 |
| 5,987,062 | * 11/1999 | Engwer et al. | 455/434 |
| 5,995,835 | * 11/1999 | De Seze et al. | 455/436 |
| 6,035,197 | * 3/2000 | Haberman et al. | 455/439 |

FOREIGN PATENT DOCUMENTS 1 535 573 GB  12/1978 (GB).

OTHER PUBLICATIONS

Karl Weiss and Dave Muri, "Conventional Local Area Radio Coverage System", Motorola Technical Developments 13:67–69 (1991).

* cited by examiner

Primary Examiner—Andy Rao

(57) ABSTRACT

A method and apparatus for implementing coordination of radio equipment. The apparatus may be used with any apparatus that is to be rendered inactive outside of a predetermined geographic area. The apparatus is equipped with a receiver for receiving a radio signal on a beacon frequency and for generating an enabling signal indicative of the presence of the radio signal. In the absence of the enabling signal, the apparatus is prevented from operating. The present invention is particularly well suited for providing coordinatible radio transmitters. The beacon signal is sent from an antenna in the geographic area in which the apparatus is permitted to transmit. The beacon signal includes a code which must match a code stored in the apparatus. In one embodiment of the present invention, the beacon signal also includes an authentication signature to prevent fraudulent beacons from improperly enabling equipment.

9 Claims, 3 Drawing Sheets

METHOD FOR COORDINATING THE OPERATION OF MOBILE EQUIPMENT

FIELD OF THE INVENTION

The present invention relates to methods and apparatuses for restricting the use of certain equipment to defined geographical areas, and more particularly, to an improved system for coordinating the operation of communication equipment to prevent interference between that equipment and other equipment operating on similar frequencies.

BACKGROUND OF THE INVENTION

There are various applications in which the operation of equipment may advantageously be limited to a certain predefined geographic area. One example of such an application is in the field of communications. The number of potential users for any given portion of the communication spectrum is much greater than the available bandwidth in most areas. One method for accommodating the various potential users is to prioritize the uses of the frequency band. Prioritization allows a low priority user to access the band when the high priority users are not using the band, thereby allowing the band to be used without interfering with the high priority usage. To prevent lower priority systems from causing interference to higher priority systems, it may be necessary to forbid the operation of the lower priority systems in certain geographical areas.

For example, under the current Federal Communications Commission (FCC) rules, wireless equipment operating in the Unlicensed Personal Communications Services (U-PCS) allocation 1910–1930 MHz will only be allowed in areas in which the equipment will not interfere with the microwave links currently operating in that spectral allocation. If the equipment is moved into a region in which it might cause interference to such microwave links, it must shut down.

Equipment that is capable of such controllable behavior is referred to as "coordinatible." Similarly, equipment that is not capable of such behavior is said to be "non-coordinatible." A wireless PBX (W-PBX) is an example of a coordinatible system. The handset is designed to shut down outside of range of the W-PBX, and the W-PBX can be made difficult to transport into a region in which it could cause interference. In contrast, a residential cordless phone is noncoordinatible. While the handset is also designed to shut down outside of range of its base station, the base station and handset can easily be moved together to another location in which the system may cause interference.

Under the plan and program mandated by the FCC, an agency will be empowered to arrange and schedule the shutting down of existing microwave links operating in the U-PCS allocation, on a regional basis. As each region is cleared out, coordinatible equipment can be deployed in the U-PCS spectrum in that region; whereas non-coordinatible equipment cannot be deployed there. Once all of the equipment is replaced by coordinatible equipment, the interference problems will be substantially reduced.

At present, no completely adequate method for implementing the coordination scheme has been approved. While the coordination of the handsets of wireless phones is relatively simple to implement if the base stations are fixed, coordination of base station operation is more difficult. The handset can be programmed to shut down if it does not receive a signal from its base station. However, one must still provide some method for shutting down the base station if it is moved from its approved geographic area.

It has been suggested that the coordination of the base station and/or handset can be accomplished by requiring the coordinatible equipment to shut down if it is not within range of a high powered transmitter such as an FM broadcasting station. However, this proposal requires the equipment to be set up based on the pattern and power levels of existing FM broadcasting stations in each region. This pattern changes with time. In addition, the pattern of stations in any geographic area is not necessarily unique. Furthermore, counterfeit FM signals can be generated that would allow a coordinatible system to run outside its area of intended use. Finally, there are areas of the country in which suitable FM broadcast stations are not available.

It is one object of the present invention to provide an improved method for enforcing geographic restrictions on coordinatible radio equipment.

It is a further object of the present invention to provide a system for restricting the operation of coordinatible radio equipment even if the equipment is moved to a new location.

It is a still further object of the present invention to provide a coordinatible equipment system that provides protection against accidental or intentional enablement in an unauthorized area because of the presence of a broadcast source in the unauthorized area.

These and other objects of the present invention will become apparent to those skilled in the art from the following detailed description of the invention and the accompanying drawings.

SUMMARY OF THE INVENTION

The present invention is a method and apparatus for implementing coordination of equipment, particularly radio equipment. The present invention may be used with various types of equipment. In particular, the present invention may be used with any apparatus having a coordinatible radio transmitter that is to be rendered inactive outside of a predetermined geographic area. Such an apparatus is equipped with a receiver for receiving a radio signal on a beacon frequency and for generating an enabling signal indicative of the presence of the radio signal. In the absence of the enabling signal, the transmitter is prevented from transmitting. The beacon signal is sent from an antenna in the geographic area in which the apparatus is permitted to transmit. The beacon signal includes a code which must match a code stored in the apparatus. In one embodiment of the present invention, the beacon signal also includes an authentication signature to prevent fraudulent beacons from improperly enabling equipment.

DETAILED DESCRIPTION OF THE INVENTION

The present invention uses a broadcast radio signal to coordinate the operation of the coordinatible equipment. In the example of communication systems having different priorities, a broadcast radio signal coordinates the operation of the lower priority systems, so that their operation cannot cause interference even if they move or are relocated into the neighborhood of the higher priority systems. The method depends upon the mobile lower priority system listening to a radio beacon that indicates that the area is free from higher priority systems. The lower priority system will only operate if it receives a signal from the beacon.

Figure 1:
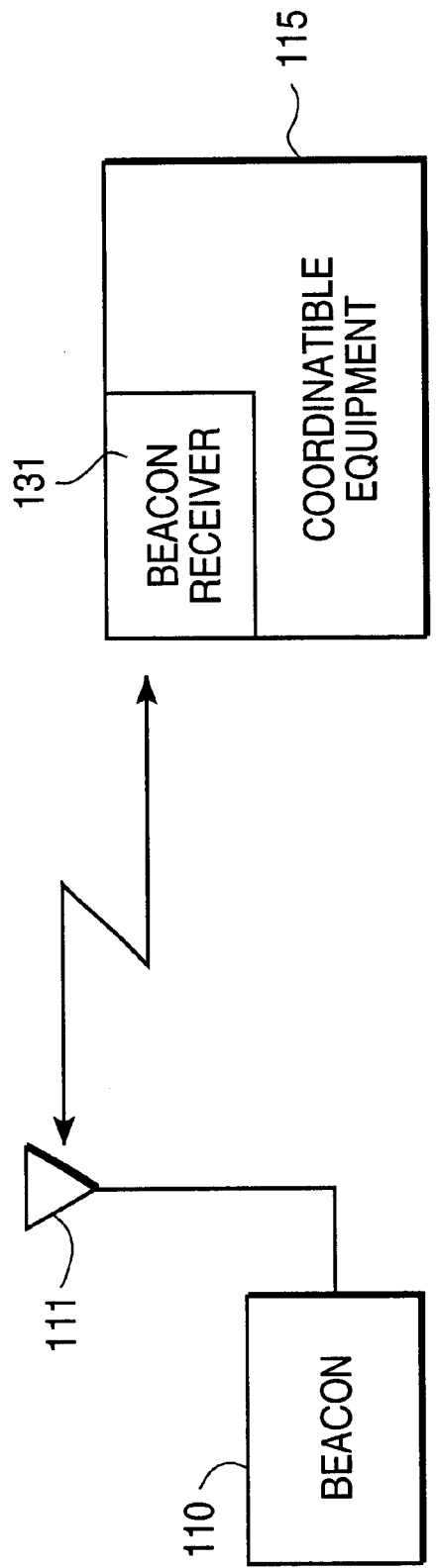
FIG. 1 is a schematic drawing of a coordination system according to the present invention.

FIG. 1 is a schematic drawing of a coordination system according to the present invention. As illustrated in FIG. 1, a beacon 110 transmits a radio signal that is broadcast from an antenna 111. A coordinatible equipment 115 has a beacon receiver 131. The beacon receiver 131 is generally capable of receiving the radio signal that is broadcast from the antenna 111. Based on whether the beacon receiver 131 actually receives the radio signal from the beacon 110 and/or based on the content of the radio signal received, either the coordinatible equipment 115 operates normally or the coordinatible equipment 115 is disabled. Specific aspects of one embodiment of the present invention, a coordinatible radio transmitter, are described in greater detail below.

Figure 2:
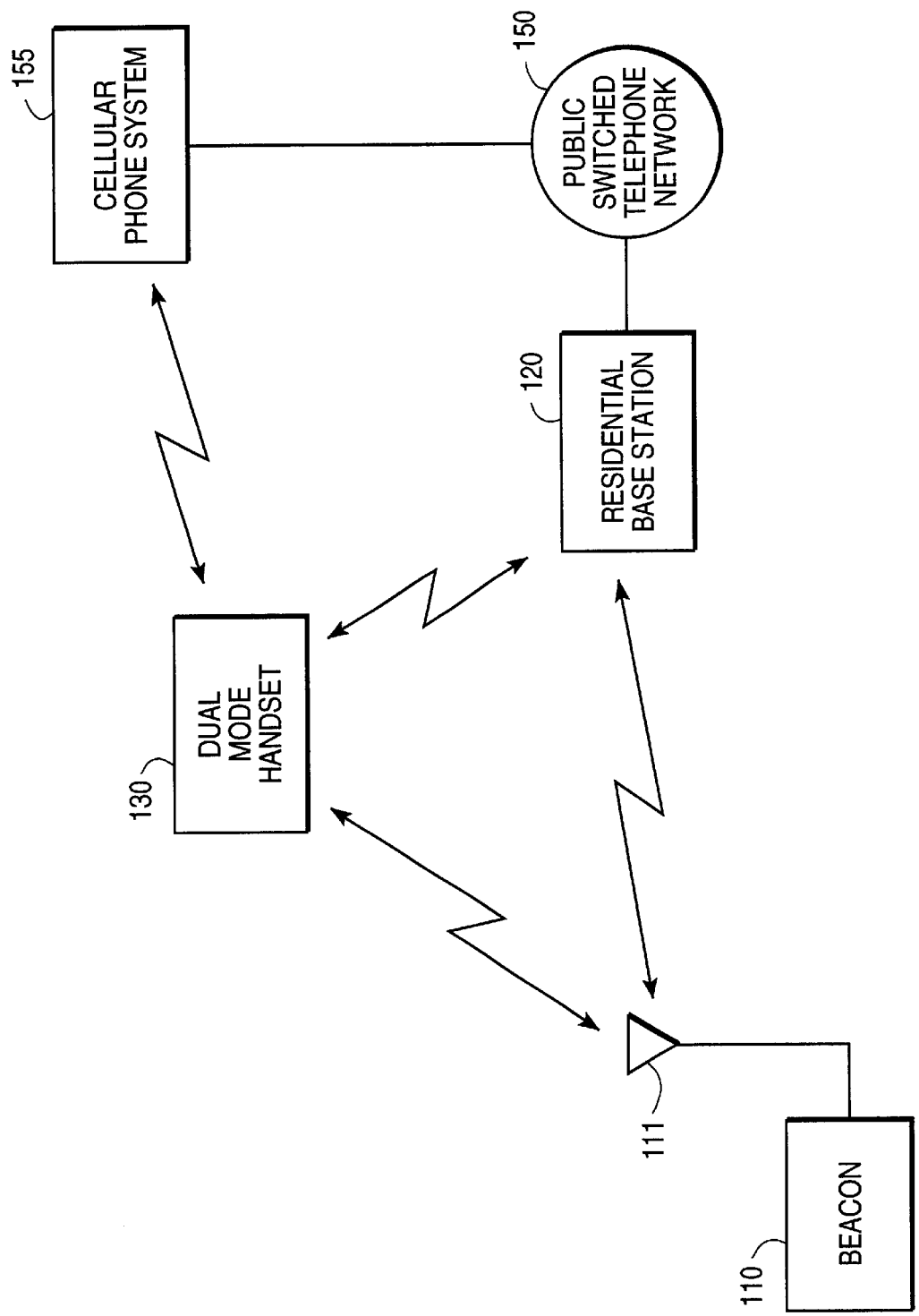
FIG. 2 is a schematic drawing of a preferred embodiment coordination system according to the present invention.

Refer now to FIG. 2 which is a schematic drawing of an exemplary coordination system according to the present invention. In the example shown in FIG. 2, the coordinatible system consists of a cordless phone system in which the handset is a dual mode handset. Handset 130 can communicate either with cellular phone system 155 or residential base system 120. When the handset is within range of base station 120, it places calls on PSTN 150 through the base station. When the handset is out of the range of base station 120, it switches to a cellular mode and places calls through cellular phone system 155.

In each area in which handset 130 and/or residential base station 120 are permitted to operate in the non-cellular mode, a beacon 110 operates. Beacon 110 transmits a radio signal that is broadcast from an antenna 111 at relatively high power. The signal identifies the antenna by a code, which must be authenticated; and also indicates whether or not operation of the handset is permitted within the geographical area. The geographical area of a particular beacon is preferably defined to be the area in which that beacon is the strongest beacon of that type perceptible by the coordinatible equipment.

In the preferred embodiment of the present invention, the beacon frequency is chosen to be different from that at which the coordinatible equipment operates to assure that the beacon does not interfere with the operation of equipment intended for use in that band. However, it will be apparent to those skilled in the art that the beacon can operate in the same frequency band as the coordinatible equipment if the duty cycle of the beacon is small. In this case, the coordinatible equipment includes a timer which is enabled each time the beacon signal is received. The timer allows the equipment to operate for a short period of time in the absence of the beacon signal. A beacon frequency in the communication band enables the beacon receiver to share the in-band receiver of the apparatus, thereby reducing the cost of the equipment.

Figure 3:
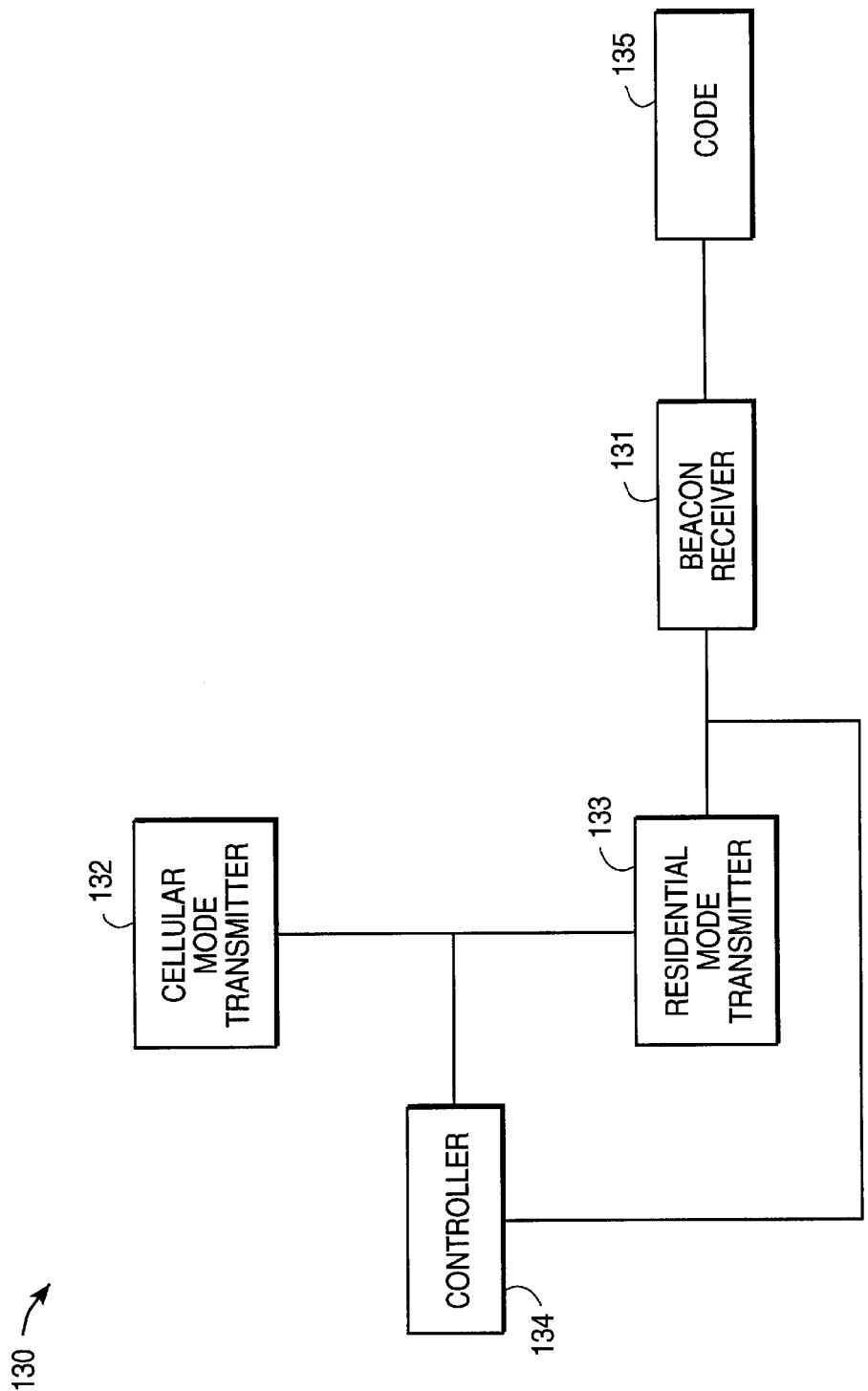
FIG. 3 is a block diagram of a coordinatible handset according to the present invention.

Refer now to FIG. 3 which is a block diagram of handset 130. Handset 130 includes a beacon receiver 131. Handset 130 includes two transmitters, a cellular transmitter 132 for communication with the cellular phone system 155 and a residential mode transmitter for communicating with base station 120. Beacon receiver 131 detects the radio beacon, authenticates it as a valid beacon, and interprets the signal to determine whether or not operation is allowable. Beacon receiver 131 preferably generates an enabling signal that enables the operation of transmitter 133. In the absence of this enabling signal, transmitter 133 will not transmit. Handset 130 also includes a controller 134 which monitors beacon receiver 131 and provides an indication to the user that transmission on the residential frequency is no longer allowed.

Each piece of coordinatible equipment stores a code 135 which must match a code sent by the beacon. Hence, even if the base station is moved to a new location, the accompanying handsets and base station will not operate until the units are provided with new codes. Since the primary mode of enablement is through the matching of this code, a small number of beacon frequencies may be used to implement a nationwide system.

In the preferred embodiment of the present invention, the beacon identification is designed to prevent a fraudulent beacon from enabling equipment in an area in which such equipment is not to operate. In addition to broadcasting a unique code, the beacon broadcasts an encrypted signature that inhibits persons wishing to broadcast a fraudulent beacon signal. The encrypted signature message preferably changes with time so that it cannot be duplicated by recording a valid beacon. For example, if the beacon periodically broadcasts the time (month/day/hour/minute/second) once every few minutes, encoded by any reasonable method, it can only be understood by an entity which possesses the encryption key. The receiving base station will decrypt the signal and will understand the message as a time stamp. Further security can be obtained by requiring the equipment to compare each time stamp to the last one received to assure continuity in the base station signal.

By sending month/day/hour/minute/second in the time stamp, a person wishing to generate a fraudulent signal would need to record the entire message for at least a year. Under this approach, any reasonable encrypting system may be used including "public key" encryption systems.

While the above described embodiments of the present invention have been described in terms of a dual mode handset, it will be apparent to those skilled in the art from this discussion that the present invention may be used with any piece of equipment whose operation is to be limited to certain geographic areas. In fact, the equipment does not even have to have a transmitter. For example, the present invention may be used to enforce licensing restrictions on a patented product by limiting the use of the product to a particular area. In this case, the product need only have a beacon receiver. The product to be restricted must contain some component that is only activated when the beacon receiver detects a valid beacon signal.

The present invention may also be utilized to restrict the geographic area in which software may be used to enforce licensing agreements. In this case, the coordinated component is an electronic key which enables the software to operate. Such key systems are well known in the computer arts, and hence, will not be discussed in detail here. For the purposes of the present discussion, it is sufficient to note that a module comprising the key is connected to the computer, usually through a serial port. The software queries the serial port for a coded response. If the response is not received, the software will not function. In a key module according to the present invention, the module also includes a beacon receiver. In the absence of the correct beacon signal, the module will not provide the coded response required by the software. Such a system would prevent software sold for operation in a first country from being illegally copied and transported to another country.

The beacon antenna can be a dedicated antenna that is deployed specifically for this function. Alternatively, existing antennae may be utilized if the antennae have available time-frequency resources to broadcast the beacon signal. Existing antennae for cellular or licensed PCS applications which operate at the power levels needed to reach the various coordinatible equipment installations are particularly attractive in this regard. Coordinatible equipment intended for use in the cellular or licensed PCS band, in addition to the band that requires coordination, naturally includes a receiver for the cellular phone frequency bands. When the equipment is operating in the non-cellular mode, which is the coordinatible mode, the equipment uses its cellular receiver to monitor the beacon. When operating in the cellular mode, the equipment is not required to monitor the beacon; hence, the receiver is free for its normal cellular functions.

Various modifications to the present invention will become apparent to those skilled in the art from the foregoing description and accompanying drawings. Accordingly, the present invention is to be limited solely by the scope of the following claims.

What is claimed is:

1. In an apparatus having a coordinatible radio transmitter that is to be rendered inactive outside of a predetermined geographic area, said coordinatible radio transmitter transmitting in a first frequency band, the improvement comprising:

beacon receiving means for receiving a beacon radio signal; and transmitter enabling means for enabling said transmitter only while said beacon receiving means is receiving a unique beacon radio signal.

2. The apparatus of claim 1 wherein said apparatus further comprises a second radio transmitter and receiver for transmitting and receiving signals on a second frequency band different from said first frequency band, transmissions on said second frequency band being enabled in the absence of said beacon radio signal, and wherein said radio beacon signal is sent in said second frequency band.

3. A method for preventing a radio transmitter from transmitting outside a defined geographic area, said method comprising the steps of:

providing said radio transmitter with a beacon receiver for receiving a unique beacon radio signal such that said transmitter transmits only while said beacon signal is received.

4. The method of claim 3 wherein said unique beacon radio signal is transmitted from an antenna in said defined geographic area.

5. In an apparatus having a component that is to be rendered inactive outside of a predetermined geographic area, the improvement comprising:

beacon receiving means for receiving a beacon radio signal; and transmitter enabling means for enabling said transmitter only while said beacon receiving means is receiving a unique beacon radio signal.

6. An apparatus as in claim 1 further including means for authenticating said beacon radio signal by analysis of the beacon signal itself so as to prevent a fraudulent beacon from enabling the radio transmitter in a geographic area in which the radio transmitter is not permitted to operate.

7. The apparatus of claim 6 wherein said means for authenticating comprises means for storing a code and means for comparing said stored code with an encrypted code transmitted in said beacon radio signal wherein if a match is found, transmission proceeds.

8. The method of claim 3 further comprising the step of authenticating said beacon radio signal by analysis of the beacon signal itself so as to prevent a fraudulent beacon from enabling the radio transmitter in a geographic area in which the radio transmitter is not permitted to operate.

9. The method of claim 8 wherein said authenticating step comprises the substeps of storing a code and comparing said stored code with an encrypted code transmitted in said beacon radio signal wherein if a match is found, transmission proceeds.

* * * * *